United States Patent
Wu

(10) Patent No.: US 9,168,721 B2
(45) Date of Patent: Oct. 27, 2015

(54) TILE AND METHOD FOR MANUFACTURING THE SAME

(75) Inventor: Kuo-Min Wu, Guanyin Township (TW)

(73) Assignee: KING-TILE CORP. (TW)

( * ) Notice: Subject to any disclaimer, the term of this patent is extended or adjusted under 35 U.S.C. 154(b) by 935 days.

(21) Appl. No.: 13/308,668

(22) Filed: Dec. 1, 2011

(65) Prior Publication Data

US 2013/0143012 A1 Jun. 6, 2013

(51) Int. Cl.
| | |
|---|---|
| *B32B 38/00* | (2006.01) |
| *B32B 27/06* | (2006.01) |
| *E04F 15/00* | (2006.01) |
| *B32B 37/06* | (2006.01) |
| *B32B 27/08* | (2006.01) |
| *B32B 27/36* | (2006.01) |
| *E04F 15/10* | (2006.01) |
| *B32B 37/10* | (2006.01) |
| *B32B 37/00* | (2006.01) |
| *B32B 38/06* | (2006.01) |

(52) U.S. Cl.
CPC .................. *B32B 27/08* (2013.01); *B32B 27/36* (2013.01); *B32B 38/00* (2013.01); *E04F 15/105* (2013.01); *E04F 15/107* (2013.01); *B32B 37/06* (2013.01); *B32B 37/10* (2013.01); *B32B 37/156* (2013.01); *B32B 38/0036* (2013.01); *B32B 38/06* (2013.01); *B32B 2038/006* (2013.01); *B32B 2307/412* (2013.01); *B32B 2307/554* (2013.01); *B32B 2307/75* (2013.01); *B32B 2367/00* (2013.01); *B32B 2419/04* (2013.01); *Y10T 156/10* (2015.01); *Y10T 156/108* (2015.01); *Y10T 156/1052* (2015.01); *Y10T 156/1062* (2015.01); *Y10T 156/1075* (2015.01); *Y10T 156/12* (2015.01); *Y10T 428/24851* (2015.01); *Y10T 428/24868* (2015.01)

(58) Field of Classification Search
CPC ............ B32B 38/105; B32B 2038/006; B32B 2250/03; B32B 2250/24; B32B 2250/006; B32B 27/08; B32B 27/32; E04F 15/02; Y10T 156/12; Y10T 156/108; Y10T 156/1075; Y10T 156/1074; Y10T 156/1066; Y10T 156/1062
See application file for complete search history.

(56) References Cited

U.S. PATENT DOCUMENTS

| 4,888,145 | A * | 12/1989 | Allner et al. | 264/126 |
| 7,678,466 | B2 * | 3/2010 | Nam | 428/480 |
| 2006/0157195 | A1 * | 7/2006 | Laurence et al. | 156/307.1 |

* cited by examiner

*Primary Examiner* — Linda L Gray
(74) *Attorney, Agent, or Firm* — Schmeiser, Olsen & Watts, LLP

(57) ABSTRACT

A tile includes a protecting layer, a printing layer, and a filler layer. The protecting layer, the printing layer, and the filler layer are laminated to each other in a top-to-bottom sequence. The protecting layer, the printing layer, and the filler layer are made of polyethylene terephthalate (PETG). Hence, the tile made of PETG meets environmental friendly requirements, is suitable for use in different locations, and easy adhesion in installation. A method for manufacturing a tile includes the steps of: providing a protecting layer, a printing layer, and a filler layer, wherein the protecting layer, the printing layer, and the filler layer are made of PETG; laminating the protecting layer, the printing layer, and the filler layer in a top-to-bottom sequence so as to form a semi-finished product; and stress-releasing the semi-finished tile product to form a tile.

5 Claims, 5 Drawing Sheets

TILE AND METHOD FOR MANUFACTURING THE SAME

FIELD OF TECHNOLOGY

The present invention relates to a tile and a manufacturing method thereof, and more particularly, to a tile that meets environmental protection needs, is suitable for the use in different locations, and easy in installation, and a method for manufacturing the tile.

BACKGROUND

People use different floor coverings in interior decoration. In view of the environmental issue has been paid more and more attention universally, to select an environmental friendly floor covering has become a main trend nowadays.

At present, the floor tiles made of Polyvinylchloride (PVC) gain the main market share of the floor coverings. It is mainly because of easy processing and low raw material cost.

However, PVC floor tiles will produce hydrogen chloride (HCl) when combustion or decomposition of the recycled PVC floor tiles. Consequently, it brings acid rain and soil acidification. Furthermore, the plasticizer used in PVC floor tiles is an endocrine disrupting chemical (EDC). Hence, some international organizations, such as Registration, Evaluation, Authorization and Restriction of Chemicals (REACH) has been trying to set up regulations to restrict the use of aforesaid chemical substances.

At present PVC free floor tiles, such as tiles made of polypropylene (PP), polyethylene (PE) and Surlyn have the problem on installation. Due to the molecular surface tension of PP, PE and Surlyn, the tiles are not easy to adhere to the floors and cause a great deal of failures in installation.

Therefore, it is imperative to invent a kind of floor tile and a manufacturing method to meet the environmental friendly requirement and meanwhile, easy adhesion in installation.

SUMMARY

In order to improve the disadvantage of the traditional floor tiles in installation and meet the environmental friendly requirement, the inventor has put lots of efforts and invented a kind of floor tile made of polyethylene terephthalate (Terephthalic Acid) PETG and a method of producing this kind of floor tile.

It is the primary objective of the present invention to provide a kind of floor tile made of PETG and a method of producing this kind of tiles to meet the environmental friendly requirement and meanwhile, easy adhesion in installation.

In order to achieve the above and other objectives, the present invention provides a tile comprising a protecting layer, a printing layer and a filler layer. The protecting layer, the printing layer and the filler layer are laminated to each other in a top-to-bottom sequence. The protecting layer, the printing layer and the filler layer are made of PETG.

The tile is made of PETG and, therefore, meet the environmental friendly requirement, is suitable for use in different locations, and meanwhile, easy adhesion in installation.

Furthermore, a method for manufacturing the tile according to the present invention comprises the following steps:

providing a protecting layer, a printing layer, and a filler layer, wherein the protecting layer, the printing layer and the filler layer are made of PETG;

laminating the protecting layer, the printing layer, and the filler layer in a top-to-bottom sequence to form a semi-finished product; and stress-releasing the semi-finished product described above to form a tile.

BRIEF DESCRIPTION OF THE DRAWING

Objectives, features, and advantages of the present invention are hereunder illustrated with specific embodiments in conjunction with the accompanying drawings, in which.

DETAILED DESCRIPTION

Figure 1:
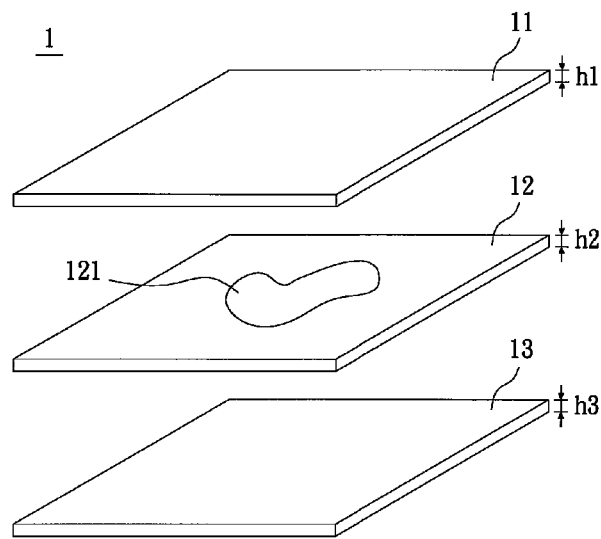
FIG. 1 is an exploded view of an embodiment according to the present invention.
Figure 2:
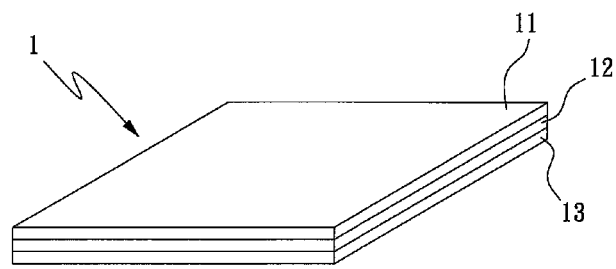
FIG. 2 is a perspective view of an embodiment according to the present invention.

Referring to FIG. 1 and FIG. 2, there is shown in FIG. 1, an exploded view of an embodiment according to the present invention, and there is shown in FIG. 2 a perspective drawing of an embodiment according to the present invention.

As shown in the drawings, a tile 1 comprises of a protecting layer 11, a printing layer 12 and a filler layer 13. The protecting layer 11, the printing layer 12 and the filler layer 13 are laminated to each other in a top-to-bottom sequence. The protecting layer 11, the printing layer 12, and the filler layer 13 are made of polyethylene terephthalate (PETG).

Hence, the tile 1 made of PETG meeting the environmental friendly requirement, is suitable for use in different locations, and easy adhesion in installation.

Specifically speaking, the tile 1 made of PETG is applicable to different locations, such as commercial areas or residential areas, and can substitute for the traditional PVC tiles. Also, PETG, with which the tile 1 is made of, is highly compatible with PVC; hence, the PVC tile industries can easily replace the traditional PVC tiles with the tile 1 made of PETG without adding any new processing process. Furthermore, the surface tension issue on the tiles made of PP, PE, and Surlyn products will not occur on the tile 1 made of PETG. Furthermore, due to the compatibility of PETG with PVC, the tile 1 made of PETG performs easy adhesion during installation.

The protecting layer 11 offers wear resistance function. It can protect the printing layer 12 to prevent from wearing off the printing designs of the tiles. As shown in FIG. 1, the protecting layer 11 is in a thickness of h1, and the thickness h1 range is between 0.15 mm and 2.0 mm. The protecting layer 11 can be a pure transparent PETG film or a solid color PETG film.

The printing layer 12 is essentially a PETG film and is printed on its surface with a printed pattern 121. Various patterns, such as printed pattern 121, can be printed on the printing layer 12, such that the tile 1 mimics nature wood, stone, marble . . . etc. As shown in FIG. 1, the printing layer 12 is in a thickness h2, and the thickness h2 range is between 0.09 mm and 0.15 mm.

The filler layer 13 is essentially composed of plenty of filler substances, such as calcium carbonate, PETG, benzoate, and a modifying agent, which are fully mixed to form the filler layer 13. In doing so, not only the overall rigidity or flexibility of the tile 1 is enhanced, but cost reduction is achieved. As shown in FIG. 1, the filler layer 13 is in a thickness h3, and the thickness h3 range is between 0.7 mm and 4.0 mm. According to different market demands, the filler layer 13 consists of multiple layers laminated to each other.

Figure 3:
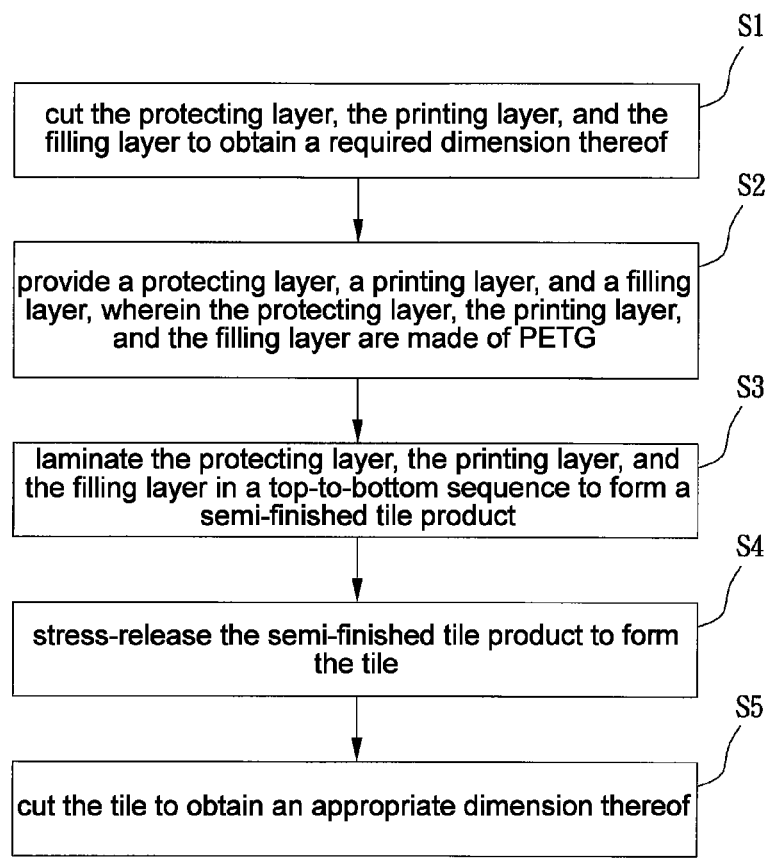
FIG. 3 is a flowchart of a process of an embodiment according to the present invention.

Referring to FIG. 1 through FIG. 3, there is shown in FIG. 3, a flowchart of a process of an embodiment according to the present invention.

As shown in the drawing, a method for manufacturing the tile 1 comprises the steps of:

firstly, providing a protecting layer 11, a printing layer 12, and a filler layer 13, wherein the protecting layer 11, the printing layer 12, and the filler layer 13 are made of PETG (S2); then, laminating the protecting layer 11, the printing layer 12, and the filler layer 13 in a top-to-bottom sequence to form a semi-finished product (S3); and stress-releasing the semi-finished product to form the tile 1 (S4).

Figure 4:
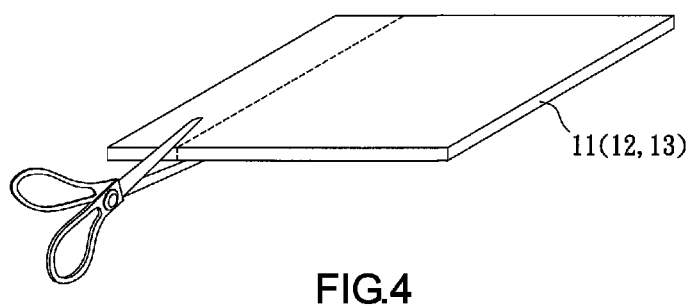
FIG. 4 is a schematic view of cutting of an embodiment according to the present invention.

Referring to FIG. 1 through FIG. 4, there is shown in FIG. 4 a schematic view of cutting of an embodiment according to the present invention.

In practice, the method for manufacturing the tile 1 further comprises, before the step of providing the protecting layer 11, the printing layer 12, and the filler layer 13, the step of cutting the protecting layer 11, the printing layer 12, and the filler 13 to obtain a required dimension thereof (S1), as shown in FIG. 4, that is, cutting the protecting layer 11, the printing layer 12, and the filler layer 13 to obtain a required dimension thereof as needed.

In practice, the method for manufacturing the tile 1 further comprises, after the step of stress-releasing the semi-finished tile product, the step of cutting the tile 1 to obtain an appropriate dimension thereof (S5), that is, cutting the tile 1 to obtain an appropriate dimension thereof as required by the customers (in a manner shown in FIG. 4).

Figure 5:
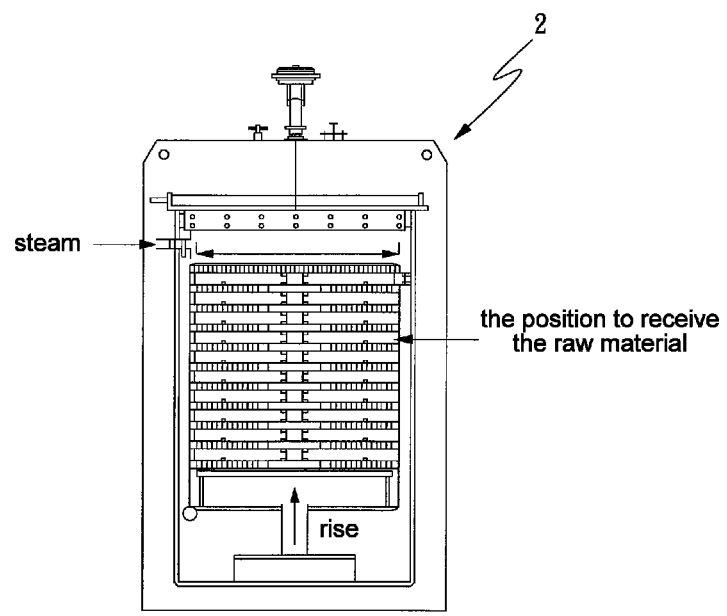
FIG. 5 is a schematic view of a hydraulic laminating device of an embodiment according to the present invention.
Figure 6:
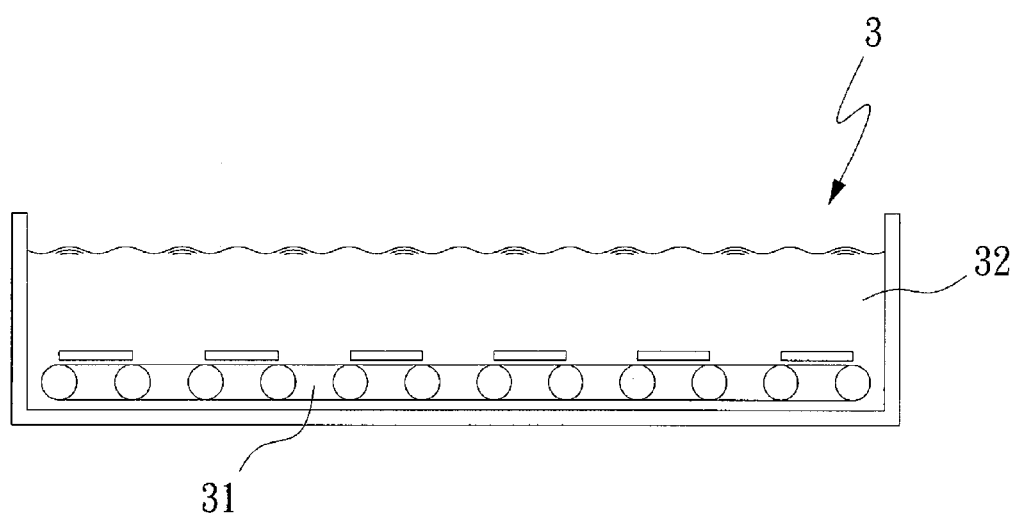
FIG. 6 is a schematic view of a stress-releasing tank of an embodiment according to the present invention.

Referring to FIG. 1 through FIG. 6, there is shown in FIG. 5 a schematic view of a hydraulic laminating device of an embodiment according to the present invention, and there is shown in FIG. 6 a schematic view of a stress-releasing tank of an embodiment according to the present invention.

As shown in FIG. 5, the protecting layer 11, the printing layer 12, and the filler layer 13 are laminated in a top-to-bottom sequence by a hydraulic laminating device 2. The temperature, pressure, time, etc. of the hydraulic lamination of the protecting layer 11, the printing layer 12, and the filler layer 13 can be set according to the material characteristics thereof.

As shown in FIG. 6, the step of stress-releasing the semi-finished product is performed by a stress-releasing tank 3. In practice, the stress-releasing tank 3 is a partly open container. The stress-releasing tank 3 is provided therein with a continuous conveyor belt 31 made of stainless steel. The stress-releasing tank 3 is filled with hot water 32. The temperature of the hot water 32 can be adjusted to fall within a temperature range, such as 80° C.~100° C., according to the material characteristics of the protecting layer 11, the printing layer 12, and the filler layer 13. The water level of the hot water 32 has to be at least 15 cm higher than the conveyor belt 31. The hydraulic laminated semi-finished product is positioned at a starting end of the conveyor belt 31. Then, the conveyor belt 31 carries the semi-finished product in a manner that the semi-finished product is immersed in the hot water 32. Finally, the semi-finished product is removed from the hot water 32 at the other end of the conveyor belt 31. After being removed from the hot water 32, the semi-finished product is wiped and stacked to finalize the stress-releasing step. One of the features of the working principle of the stress-releasing step is: the shaping of thermoplastic plastics (polymers) is always accompanied by residual stress, and the residual stress does not vanish even after the hydraulic laminating process is finished; if residual stress exists in a material, it will have an adverse effect on the size of a finished product. The hot water 32 functions as a medium for the stress-releasing tank 3. A real test confirms that: PETG does not react with the hot water 32, nor does the hot water 32 enter interstices of PETG. Hence, according to the present invention, the hydraulic laminated semi-finished product is heated up to approximate the transition temperature of PETG so as to release the residual stress therein and effectuate the stability of the size of a finished tile.

Figure 7:
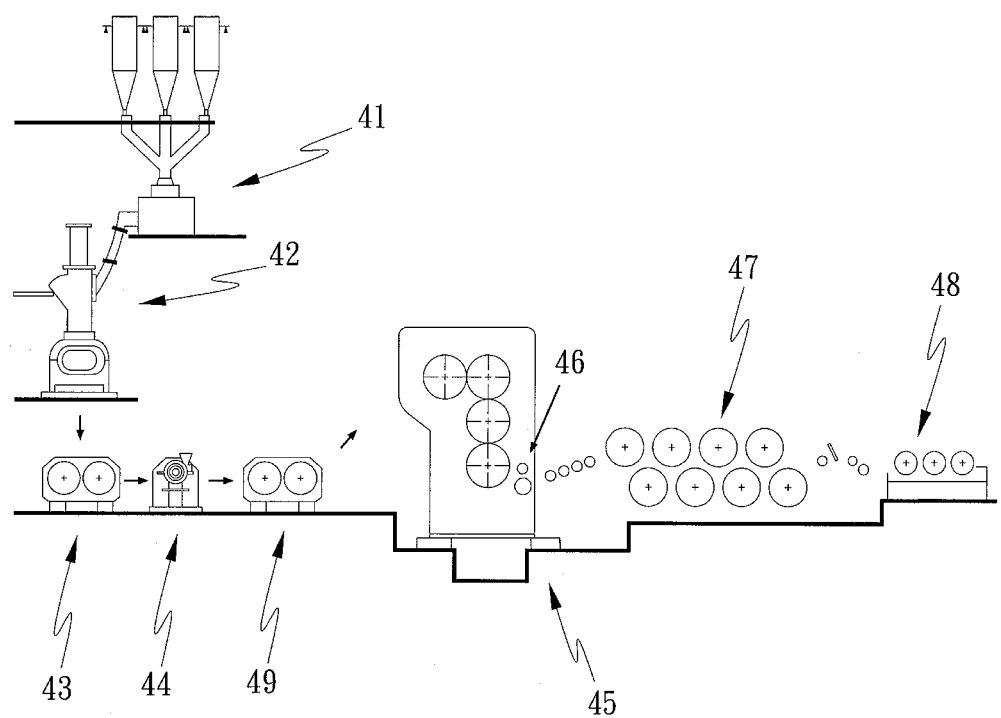
FIG. 7 is a schematic view of a PETG film forming process of an embodiment according to the present invention.

Referring to FIG. 7, there is shown a schematic view of a PETG film forming process of an embodiment according to the present invention.

The protecting layer 11, the printing layer 12, and the filler layer 13 (shown in FIG. 1) are made of PETG, and the PETG film forming process is as follows:

1. Mixing: a mixer 41 capable of changing the operating speed thereof, having a mixing wing, and adapted to generate a uniform whirling motion under its shear force and frictional force, so as to fully disperse and mix PETG and various additive raw materials.

2. Kneading: kneading is performed by a fluxing device 42 having a pressing hammer disposed thereabove. The chamber of the fluxing device 42 accommodates two rotors each having a hunched wing-like structure, and the two rotors rotate in a direction opposite to each other. The strong cutting operation is performed between an axle and the chamber wall and between a rotor and another rotor; hence, heat is generated for performing the fluxing process. The aforesaid kneading process is like kneading flour to form a flour dough. PETG molecules are pulled apart and flux with various raw materials to form viscous and elastic plastics.

3. Fluxing: a roller device 43 serves as a fluxing tool. The roller device 43 consists of two rollers capable of changing the operating speed thereof and changing the temperature thereof. Due to the difference in the speed between the two rollers, the mixed raw materials are cut, and thus heat is generated. The front roller is heated up to a temperature slightly higher than the rear roller. Heating the raw materials continuously and with manual cross cutting repeatedly until the raw materials are appropriately gelatinized.

4. Filtering: filtering is mainly performed by an extruder 44. A filtering wire gauze is installed at the outlet, which manifests three features as follows:

i. providing an appropriate temperature and feeding an evenly gelatinized material into a plastic fabric machine;

ii. fending off rigid particles, such as stones or iron scraps, to protect the plastic fabric machine and prevent the rollers from being damaged; and iii. maintaining a uniform temperature of the plastic materials rather than rising.

5. Secondary fluxing: a roller device 49 serves as a fluxing tool, as described in point 3.

6. Calendering: a plastic fabric machine 45 serves as a major production tool. The primary function of the plastic fabric machine 45 is to calender a polymer plastic dough to form a film. The gelatinized soft raw materials enter the plastic fabric machine 45 by passing through a nip between the first roller and the second roller, so that the plastic dough is compressed to take on a sheet-like appearance. The sheet-like plastic dough winds around the second roller to enter a nip between the second roller and the third roller. After leaving the nip between the second roller and the third roller, the plastic dough winds around the third roller to enter a nip between the third roller and the fourth roller. Upon its entry into a nip between two rollers, the plastic dough always leaves behind a trace (known as a bank) thereof. The bank rotates together with the rollers. The calendaring can be completed only in the presence of the continuity of three banks.

7. Embossing apparatus: an embossing apparatus 46 imprints a required pattern on the surface of the plastic fabric in a state of plasticity. Some products require single-side embossing, and the other products require two-side embossing; hence, there are two types of embossing rollers, namely single-side embossing rollers and two-side embossing rollers.

8. Cooling roller assembly: a cooling roller assembly 47 consists of 8 to 12 cooling rollers between which the cooling water and the freezing water pass through. The high temperature of the plastic fabric is gradually decreased to a normal temperature by heat exchange. The temperature of the cooling rollers is distributed in the manner that it decreases from the front roller to the rear roller. If the water flows from the front to the rear in the same direction as the plastic fabric does, the temperature will decrease gradually.

9. Cutting: after the burrs of the plastic fabric have been trimmed off, the plastic fabric enters a slicer 48 such that the slicer 48 can cut the plastic fabric to obtain a required dimension thereof. In addition to cutting, the slicer 48 performs calculation of the total length of the slices.

Hence, the present invention meets the three requirements of patentability, namely novelty, non-obviousness, and industrial applicability. Regarding novelty and non-obviousness, the present invention discloses a tile made of PETG, so that the tile meets environmental friendly requirement, is suitable for the uses in different locations, and meanwhile, easy adhesion in installation. Regarding industrial applicability, products derived from the present invention fully meet current market demands.

The present invention is disclosed above by preferred embodiments. However, persons skilled in the filed should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method for manufacturing a tile, the method comprising the steps of:
    providing a protecting layer, a printing layer, and a filler layer, wherein the protecting layer, the printing layer, and the filler layer are made of PETG;
    laminating the protecting layer, the printing layer, and the filler layer in a top-to-bottom sequence so as to form a semi-finished product; and
    immersing the semi-finished product in a stress-releasing tank filled with hot water, wherein a temperature of the hot water is 80° C.~100° C., to stress-release the semi-finished product to form a tile.

2. The method of claim 1, further comprising, before the step of providing the protecting layer, the printing layer, and the filler layer, the step of cutting the protecting layer, the printing layer, and the filler layer to obtain a required dimension thereof.

3. The method of claim 1, further comprising, after the step of stress-releasing the semi-finished product, the step of cutting the tile to obtain an appropriate dimension thereof.

4. The method of claim 1, wherein the protecting layer, the printing layer, and the filler layer are laminated in a top-to-bottom sequence by a hydraulic laminating device.

5. The method of claim 1, wherein the step of stress-releasing the semi-finished product is performed by a stress-releasing tank.

* * * * *